UNITED STATES PATENT OFFICE.

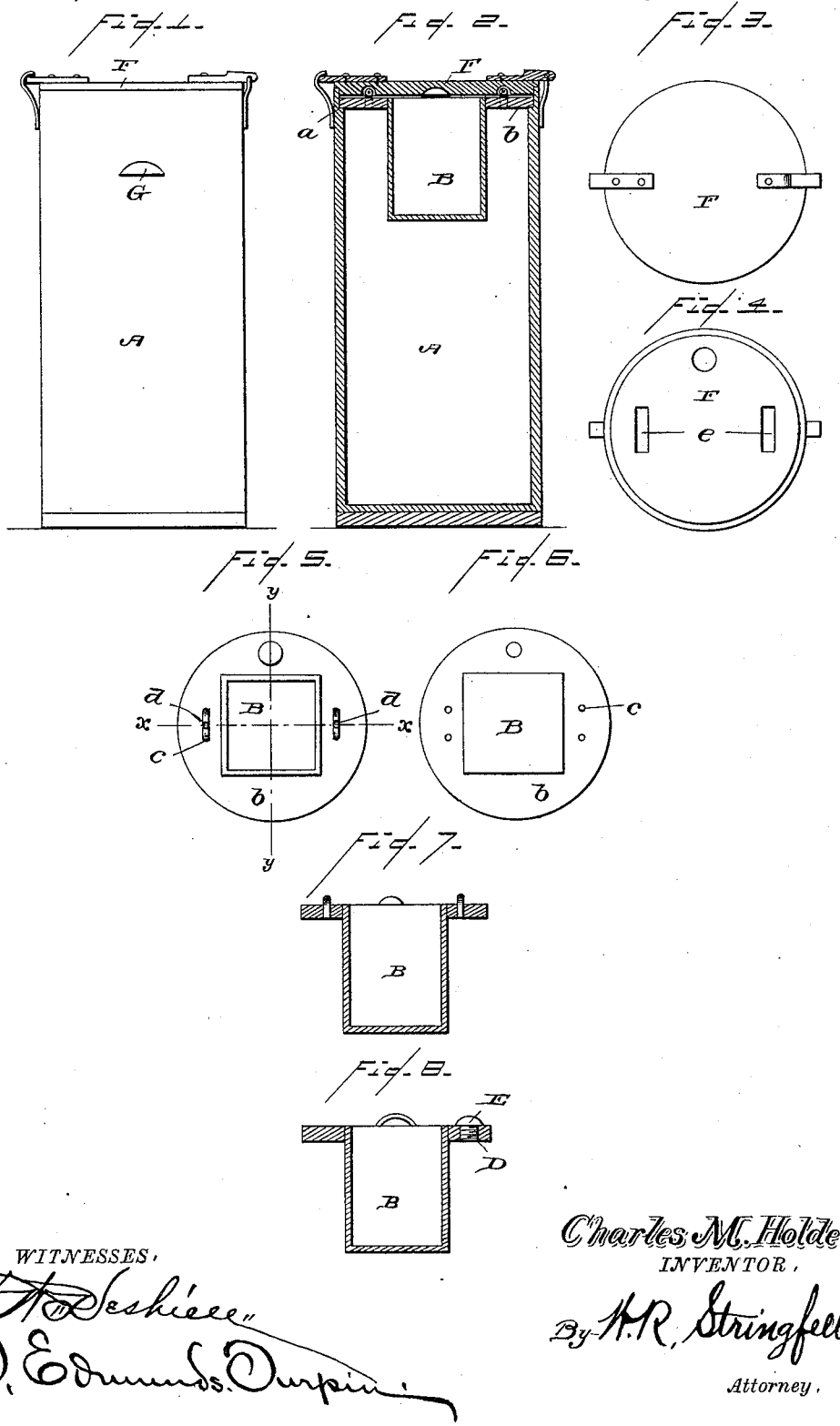

CHARLES M. HOLDEN, OF NEW ORLEANS, LOUISIANA.

MILK-CAN.

SPECIFICATION forming part of Letters Patent No. 386,540, dated July 24, 1888.

Application filed October 17, 1887. Serial No. 252,026. (No model.)

*To all whom it may concern:*

Be it known that I, CHARLES MORTIMER HOLDEN, a citizen of the United States of America, residing at New Orleans, in the parish of Orleans and State of Louisiana, have invented certain new and useful Improvements in a Shipping-Can, of which the following is a specification, reference being had therein to the accompanying drawings.

This invention relates to milk-cans using ice-chambers; and it has for its object to establish a communication between the milk-chamber and ice-chamber in such a manner that the milk may be kept cool and fresh during transportation, and the milk prevented from entering the ice-chamber, and vice versa. These objects I accomplish by the means shown, and illustrated in the accompanying drawings, in which—

Figure 1 is a side elevation of a milk-can embodying my improvements. Fig. 2 is a vertical sectional view of the same. Fig. 3 is a plan view of the cover removed from the can, and Fig. 4 is an inverted plan thereof. Fig. 5 is a plan view of the ice-chamber, and Fig. 6 is an inverted plan view of the same. Figs. 7 and 8 are sectional views of the chamber.

Referring by letter to the said drawings, A indicates a milk-can which may be of any desired construction, having an internal annular recess, *a*, which forms a shoulder for the support of an ice-chamber, as will be presently explained.

B indicates the ice-chamber, which is provided with a broad external marginal flange, *b*, at its mouth, and which serves, together with the ice-chamber, as a cover for the milk-can. This flange bears upon the annular shoulder of the can formed by the recess *a* therein, so that the ice-chamber may be held suspended in the milk-can. This flange *b* is provided with perforations *c*, which are more fully shown in Figs. 5 and 7 of the drawings. These perforations are connected on the upper side of the flange by pieces of curved pipe, each having a vent, *d*, and these pipes pass into recesses in the under side of the cover F. This flange *b* is also provided with a threaded aperture, D, which is normally closed by a screw-plug, E. By means of this aperture and plug, cream or milk may be let in or taken from the can in small quantities.

F indicates the cover, which I have shown as having diametrical arms for engaging attaching devices, although the cover may be secured to the can in any suitable manner. The under side of this cover is provided with grooves *e e*, corresponding in shape to that of the elevated portions of the vent-tubes, and are designed to receive the same. As the cover is not designed to fit closely against the flange of the ice-chamber, or at least in an air-tight manner, it will be seen that an uninterrupted communication may be formed between the said chamber and the milk-can—that is to say, that the animal heat and gases, which naturally rise from fresh milk, after passing through the vent-tubes in the flange of the ice-chamber will enter the grooves in the under side of the cover and then pass into the ice-chamber. From the construction and manner of combining these parts the milk as it splashes in the can will be prevented from entering the ice-chamber, while the heat and gases may rise through such passages and render the milk cool during transportation and use.

The can may be provided with handles G or other suitable means, by which it may be carried.

Having described my invention, what I claim is—

1. The combination, with the can, having the annular recess, as described, of the ice-chamber having the supporting-flange, the vent-tubes arranged in the said flange and the cover having grooves in its under side to receive the said tubes, substantially as specified.

2. The combination, with the can recessed as described, of the ice-chamber having the supporting-flange provided with the threaded aperture, the screw-plug for closing the same, the vent-tubes in the said flange, and the cover having the recesses to receive the said tubes, substantially as specified.

In testimony whereof I affix my signature in presence of two witnesses.

CHARLES M. HOLDEN.

Witnesses:
GEORGE J. YENEWINE,
HENRY J. RHODES.